(12) United States Patent
Tamaizumi et al.

(10) Patent No.: US 9,914,473 B2
(45) Date of Patent: Mar. 13, 2018

(54) ELECTRIC POWER STEERING SYSTEM

(71) Applicant: JTEKT CORPORATION, Osaka-shi, Osaka (JP)

(72) Inventors: Terutaka Tamaizumi, Okazaki (JP); Hirozumi Eki, Okazaki (JP); Masayuki Kita, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 157 days.

(21) Appl. No.: 15/008,751

(22) Filed: Jan. 28, 2016

(65) Prior Publication Data
US 2016/0229446 A1 Aug. 11, 2016

(30) Foreign Application Priority Data

Feb. 6, 2015 (JP) ................................. 2015-022377

(51) Int. Cl.
*B62D 5/04* (2006.01)
*B62D 6/00* (2006.01)

(52) U.S. Cl.
CPC ........... *B62D 5/0463* (2013.01); *B62D 6/002* (2013.01); *B62D 6/008* (2013.01)

(58) Field of Classification Search
CPC ...... B62D 5/0463; B62D 6/002; B62D 6/008; B62D 7/159
See application file for complete search history.

(56) References Cited

U.S. PATENT DOCUMENTS

| | | | | |
|---|---|---|---|---|
| 6,823,245 B2 * | 11/2004 | Sugitani | ................. | B60T 8/172 340/438 |
| 7,134,522 B2 * | 11/2006 | Takimoto | ............... | B62D 6/008 180/446 |
| 7,966,114 B2 * | 6/2011 | Yamazaki | ............ | B62D 5/0463 180/443 |

(Continued)

FOREIGN PATENT DOCUMENTS

| | | |
|---|---|---|
| EP | 2 708 445 A2 | 3/2014 |
| JP | 2014/040179 A | 3/2014 |

OTHER PUBLICATIONS

Dec. 8, 2016 Search Report issued in European Patent Application No. 16153236.1.

*Primary Examiner* — Tony H Winner
*Assistant Examiner* — Michael R Stabley
(74) *Attorney, Agent, or Firm* — Oliff PLC

(57) ABSTRACT

Provided is an electric power steering system that achieves a more appropriate steering feel. An ECU of the electric power steering system calculates a basic assist component and a target pinion angle based on at least steering torque. The ECU calculates a correction component for the basic assist component through feedback control in which an actual pinion angle is caused to match the target pinion angle. The ECU calculates an assist command value by adding the correction component to the basic assist component. The ECU corrects a hysteresis controlled variable and a viscosity component according to the rate of change (gradient) in a spring component with respect to a change in absolute value of the target pinion angle. Specifically, the ECU multiplies the hysteresis controlled variable and the viscosity component by gains that have a larger value as the rate of change in spring component increases.

10 Claims, 10 Drawing Sheets

(56) References Cited

U.S. PATENT DOCUMENTS

| | | | |
|---|---|---|---|
| 8,897,965 B2* | 11/2014 | Tamaizumi | B62D 5/0463 180/204 |
| 8,977,437 B2* | 3/2015 | Tamaizumi | B62D 5/0469 180/443 |
| 2013/0311044 A1 | 11/2013 | Tamaizumi et al. | |
| 2014/0058629 A1 | 2/2014 | Tamaizumi et al. | |
| 2014/0081524 A1* | 3/2014 | Tamaizumi | B62D 5/0469 701/42 |
| 2015/0057890 A1 | 2/2015 | Tamaizumi et al. | |

* cited by examiner

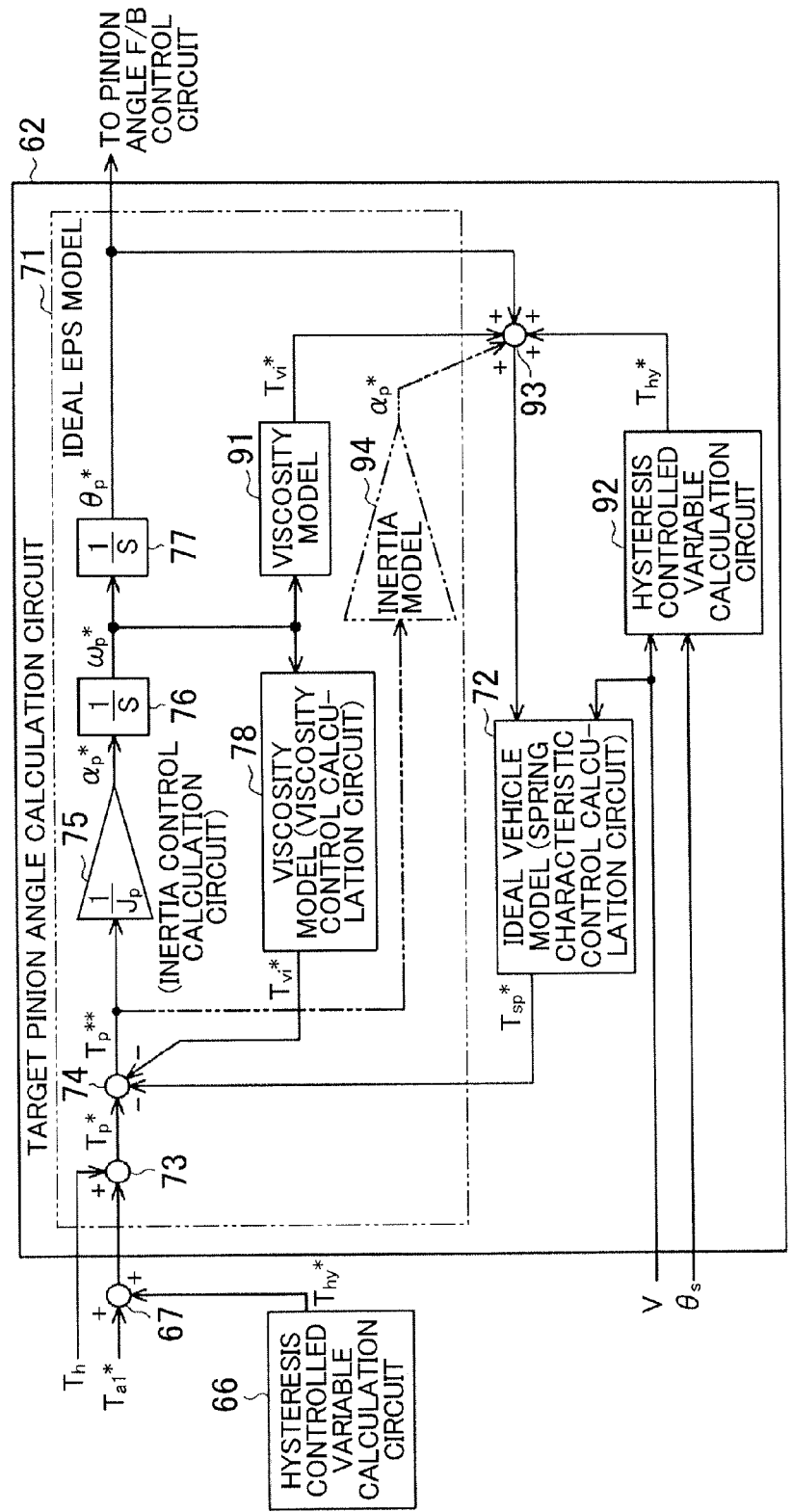

ELECTRIC POWER STEERING SYSTEM

INCORPORATION BY REFERENCE

The disclosure of Japanese Patent Application No. 2015-022377 filed on Feb. 6, 2015 including the specification, drawings and abstract, is incorporated herein by reference in its entirety.

BACKGROUND OF THE INVENTION

1. Field of the Invention

The present invention relates to electric power steering systems.

2. Description of the Related Art

Conventionally, an electric power steering system (EPS) is known which applies power of an electric motor to a steering mechanism of a vehicle to assist driver's steering operation. For example, an EPS of Japanese Patent Application Publication No. 2014-040179 (JP 2014-040179 A) includes a control device that calculates an assist command value based on the steering torque and the vehicle speed to control driving of a motor based on the assist command value. More specifically, the control device calculates a first assist component that is a basic component of the assist command value based on the steering torque and the vehicle speed. The control device also calculates a steered angle command value based on the steering torque and the first assist component and calculates a second assist component through feedback control in which an actual steered angle is caused to match the steered angle command value. The control device calculates the assist command value by adding the second assist component to the first assist component.

The control device adds the first assist component and the steering torque to obtain drive torque, and calculates from the drive torque the steered angle command value based on an ideal model. The ideal model includes an EPS-side ideal model that depends on characteristics of each element of the EPS such as a steering shaft and the motor, and a vehicle-side ideal model that depends on characteristics of the vehicle on which the EPS is mounted. The EPS-side ideal model is formed by a viscosity term that is proportional to a first-order time differential value of the steered angle and an inertia term that is proportional to a second-order time differential value of the steered angle. The vehicle-side ideal model is formed by a spring term that is proportional to the steered angle. The drive torque is modeled as the sum of the spring term, the viscosity term, and the inertia term.

In order to achieve a more appropriate steering feel, it is necessary to balance the values of the spring term, the viscosity term, and the inertia term. However, since the values of the spring term, the viscosity term, and the inertia term are determined independently, the following problem may occur depending on the balance among the values of the terms. For example, the spring reaction force based on the spring term is so strong that the viscosity reaction force (damping) based on the viscosity term is weak accordingly. In this case, the driver is less likely to feel the viscosity as a change in the steering torque. On the contrary, the viscosity reaction force based on the viscosity term is so strong that the spring reaction force based on the spring term is weak accordingly. In this case, the driver more strongly feels the viscosity as a change in the steering torque.

SUMMARY OF THE INVENTION

It is one object of the present invention to provide an electric power steering system that achieves a more appropriate steering feel.

According to one aspect of the present invention, an electric power steering system includes: a motor serving as a source of a steering assist force to be applied to a steering mechanism of a vehicle; and a control device that controls the motor according to a steering state of the vehicle. The control device includes a first calculation circuit that calculates a basic control component of the steering assist force to be applied to the steering mechanism according to at least steering torque, a second calculation circuit that calculates, based on at least the steering torque, a target rotation angle of a rotary shaft that rotates according to a steered angle of a steered wheel, a third calculation circuit that calculates a correction control component for the basic control component through feedback control in which an actual rotation angle of the rotary shaft is caused to match the target rotation angle, a first reaction force component calculation circuit that calculates a first reaction force component in the steering assist force based on at least the target rotation angle, and a second reaction force component calculation circuit that calculates a second reaction force component in the steering assist force based on at least one of a plurality of kinds of state variables representing the steering state and the target rotation angle.

In the electric power steering system of the above aspect, the control device may further include a correction circuit that corrects the second reaction force component according to a gradient of a change in the first reaction force component with respect to the target rotation angle.

According to this configuration, a reaction force based on the first reaction force component can be strong or weak depending on the gradient of the change in the first reaction force component with respect to a change in the target rotation angle. For example, the larger the gradient of the change in the first reaction force component is, the more the first reaction force component increases with the change in the target rotation angle. The driver therefore more strongly feels the reaction force based on the first reaction force component as a change in the steering torque. In this case, the driver may be less likely to feel a reaction force based on the second reaction force component as a change in the steering torque, although it depends on the value of the second reaction force component. By correcting the second reaction force component according to the gradient of the change in the first reaction force component, the balance between the reaction force based on the first reaction force component and the reaction force based on the second reaction force component can be adjusted to a more preferable balance. A more preferable steering feel can therefore be achieved.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 10 is a control block diagram of a target pinion angle calculation circuit in a second embodiment of the EPS;

DETAILED DESCRIPTION OF EMBODIMENTS

Figure 1:
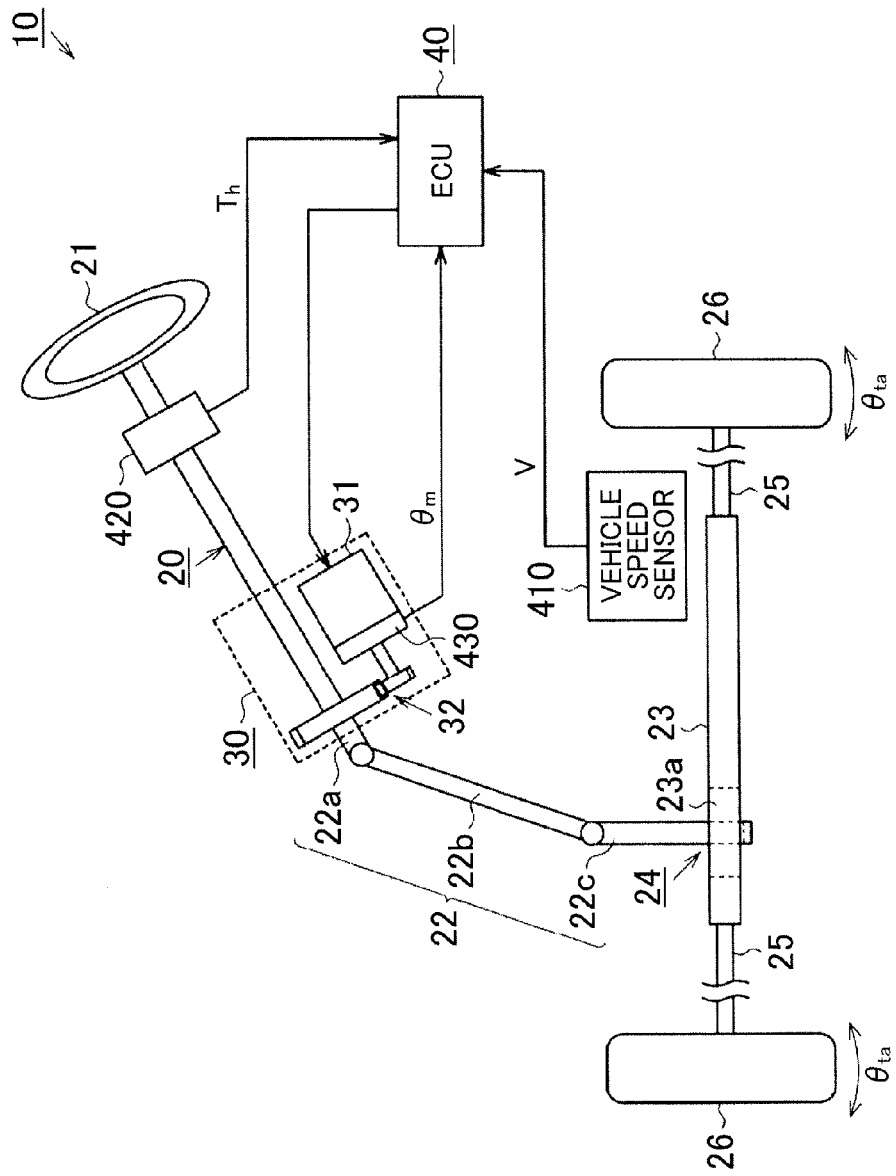
FIG. 1 is a block diagram showing the configuration of an electric power steering system (EPS)

An electric power steering system according to a first embodiment of the present invention will be described. As shown in FIG. 1, an electric power steering system (EPS) 10 includes a steering mechanism 20 that steers a steered wheel based on driver's steering operation, a steering assist mechanism 30 that assists driver's steering operation, and an electronic control unit (ECU) 40 that controls operation of the steering assist mechanism 30.

The steering mechanism 20 includes a steering wheel 21 that is operated by the driver and a steering shaft 22 that rotates together with the steering wheel 21. The steering shaft 22 is formed by a column shaft 22a coupled to the center of the steering wheel 21, an intermediate shaft 22b coupled to the lower end of the column shaft 22a, and a pinion shaft 22c coupled to the lower end of the intermediate shaft 22b. The lower end of the pinion shaft 22c meshes with a rack shaft 23 (to be exact, a portion 23a having rack teeth) extending in a direction crossing the pinion shaft 22c. Rotary motion of the steering shaft 22 is therefore converted to reciprocating linear motion of the rack shaft 23 by a rack and pinion mechanism 24 formed by the pinion shaft 22c and the rack shaft 23. This reciprocating linear motion is transmitted to right and left steered wheels 26, 26 via tie rods 25 coupled to both ends of the rack shaft 23. A steered angle $\theta_{ta}$ of the steered wheels 26, 26 is thus changed. The direction in which a vehicle travels is changed as the steered angle θta of the steered wheels 26, 26 is changed.

The steering assist mechanism 30 includes a motor 31 as a source of a steering assist force (assist force). A three-phase alternating current (AC) motor such as a brushless motor is used as the motor 31. The motor 31 is coupled to the column shaft 22a via a speed reduction mechanism 32. The speed reduction mechanism 32 reduces the speed of rotation output from the motor 31 and transmits the resultant rotational force to the column shaft 22a. That is, motor torque is applied as a steering assist force to the steering shaft 22, whereby driver's steering operation is assisted.

Various sensors are provided in the vehicle, and the ECU 40 receives the detection results of the sensors as information on a request from the driver or a traveling state of the vehicle, and controls the motor 31 according to the received information. For example, the various sensors are a vehicle speed sensor 410, a torque sensor 420, and a rotation angle sensor 430. The vehicle speed sensor 410 detects the vehicle speed (traveling speed of the vehicle) V.

The torque sensor 420 is provided on the column shaft 22a and detects steering torque $T_h$ applied to the steering shaft 22 via the steering wheel 21. The rotation angle sensor 431 is provided on the motor 31 and detects the rotation angle $\theta_m$ of the motor 31. The ECU 40 controls the motor 31 based on the vehicle speed V, the steering torque $T_h$, and the rotation angle $\theta_m$ which are received from these sensors.

Figure 2:
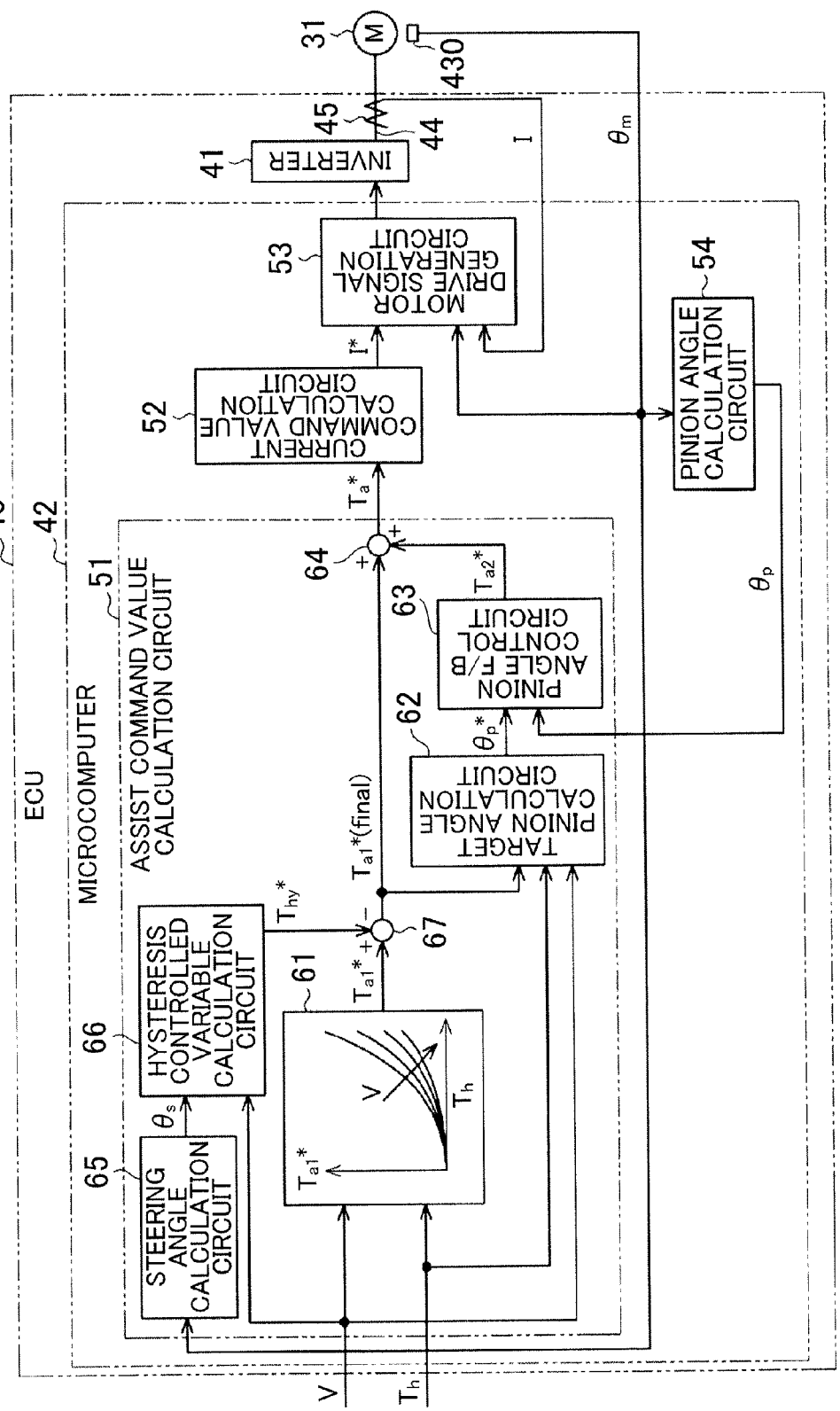
FIG. 2 is a control block diagram of an ECU.

The hardware configuration of the ECU 40 will be described. As shown in FIG. 2, the ECU 40 includes an inverter circuit 41 and a microcomputer 42.

The inverter circuit 41 converts a direct current supplied from a direct current (DC) power supply such as a battery to a three-phase alternating current based on a motor drive signal generated by the microcomputer 42. The three-phase alternating current thus produced is supplied to the motor 31 via feed paths 44 of the three phases. A current sensor 45 is provided on each of the feed paths 44 of the three phases. These current sensors 45 detect actual current values I on the feed paths 44 of the three phases. In FIG. 2, the feed paths 44 of the three phases and the current sensors 45 of the three phases are collectively shown as a single feed path 44 and a single current sensor 45 for convenience of description.

The microcomputer 42 receives each of the detection results of the vehicle speed sensor 410, the torque sensor 420, the rotation angle sensor 430, and the current sensors 45 at every predetermined sampling period. The microcomputer 42 generates a motor drive signal (a pulse width modulation (PWM) drive signal) based on the received detection results, namely the vehicle speed V, the steering torque $T_h$, the rotation angle $\theta_m$, and the current values I.

To be exact, the microcomputer 42 performs vector control of a motor current by PWM driving of the inverter circuit 41. The vector control is a method in which a motor current is resolved into a d-axis component (a field current component) parallel to a magnetic field and a q-axis component (a torque current component) perpendicular to the d-axis component, and these currents are individually controlled to target values. The motor 31 can be handled similarly to a DC motor by the vector control.

The functional configuration of the microcomputer 42 will be described. The microcomputer 42 has various arithmetic processing circuits that are implemented by executing control programs stored in a storage device, not shown. As shown in FIG. 2, the microcomputer 42 includes as the arithmetic processing circuits an assist command value calculation circuit 51, a current command value calculation circuit 52, a motor drive signal generation circuit 53, and a pinion angle calculation circuit 54.

The assist command value calculation circuit 51 receives the vehicle speed V, the steering torque $T_h$, the rotation angle $\theta_m$ of the motor 31, and the pinion angle $\theta_p$ calculated by the pinion angle calculation circuit 54 and calculates an assist command value $T_a^*$ based on the received information. The assist command value $T_a^*$ is a command value that represents a rotational force (assist torque) to be generated by the motor 31.

The current command value calculation circuit 52 calculates a current command value I* based on the assist command value $T_a$* calculated by the assist command value calculation circuit 51. The current command value I* is a command value that represents a current to be supplied to the motor 31. To be exact, the current command value I* includes a q-axis current command value and a d-axis current command value on a d-q coordinate system. The d-q coordinate system represents rotational coordinates according to the rotation angle $\theta_m$ of the motor 31.

The motor drive signal generation circuit 53 receives the current command value I*, the actual current values I, and the rotation angle $\theta_m$ of the motor 31 and performs feedback control of a current based on the received information so that the actual current values I follow the current command value I*. The motor drive signal generation circuit 53 obtains a deviation between the current command value I* and the actual current values I and generates a motor drive signal so as to eliminate the deviation.

To be exact, the motor drive signal generation circuit 53 converts the three-phase current value of the motor 31 to a two-phase vector component, namely a d-axis current value and a q-axis current value on the d-q coordinate system, by using the rotation angle $\theta_m$. The motor drive signal generation circuit 53 obtains a deviation between the d-axis current value and the d-axis current command value and a deviation between the q-axis current value and the q-axis current command value and calculates a PWM duty that eliminates these deviations. The motor drive signal generated by the motor drive signal generation circuit 53 contains the PWM duty. A voltage according to the motor drive signal is supplied to the motor 31 through the inverter circuit 41. The motor 31 thus generates a rotational force according to the assist command value $T_a$*.

The pinion angle calculation circuit 54 receives the rotation angle $\theta_m$ of the motor 31 and calculates the pinion angle $\theta_p$, or the rotation angle of the pinion shaft 22c, based on the received rotation angle $\theta_m$. As described above, the motor 31 is coupled to the column shaft 22a via the speed reduction mechanism 32.

Accordingly, there is a correlation between the rotation angle $\theta_m$ of the motor 31 and the pinion angle $\theta_p$. The pinion angle $\theta_p$ can be obtained from the rotation angle $\theta_m$ of the motor 31 by using this correlation. As described above, the pinion shaft 22c meshes with the rack shaft 23. Accordingly, there is also a correlation between the pinion angle $\theta_p$ and the amount by which the rack shaft 23 is moved. That is, the pinion angle $\theta_p$ is a value reflecting the steered angle $\theta_{ta}$ of the steered wheels 26, 26.

The assist command value calculation circuit 51 will be described in detail. As shown in FIG. 2, the assist command value calculation circuit 51 has a basic assist component calculation circuit 61, a target pinion angle calculation circuit 62, a pinion angle feedback control circuit (pinion angle F/B control circuit) 63, and an adder 64.

The basic assist component calculation circuit 61 calculates a basic assist component $T_{a1}$* based on the vehicle speed V and the steering torque $T_h$. The basic assist component $T_{a1}$* is a basic control component of the assist command value $T_a$*. The basic assist component calculation circuit 61 calculates the basic assist component $T_{a1}$* by using a three-dimensional map that defines the relationship between the steering torque $T_h$ and the basic assist component $T_{a1}$* according to the vehicle speed V. The basic assist component calculation circuit 61 sets the absolute value of the basic assist component $T_{a1}$* to a larger value as the absolute value of the steering torque $T_h$ increases and as the vehicle speed V decreases.

The target pinion angle calculation circuit 62 receives the basic assist component $T_{a1}$* generated by the basic assist component calculation circuit 61 and the steering torque $T_h$. The target pinion angle calculation circuit 62 has an ideal model that decides an ideal pinion angle based on basic drive torque (input torque). The basic drive torque is the sum of the basic assist component $T_{a1}$* and the steering torque $T_h$. The ideal model is a model of a pinion angle corresponding to an ideal steered angle according to the basic drive torque. The ideal model is obtained in advance by experiments etc. The target pinion angle calculation circuit 62 adds the basic assist component $T_{a1}$* and the steering torque $T_h$ to obtain the basic drive torque and calculates a target pinion angle $\theta_p$* from this basic drive torque based on the ideal model.

The target pinion angle calculation circuit 62 may receive the vehicle speed V and calculate the target pinion angle $\theta_p$* in view of the vehicle speed V as well.

The pinion angle feedback control circuit 63 receives the target pinion angle $\theta_p$* calculated by the target pinion angle calculation circuit 62 and the actual pinion angle $\theta_p$ calculated by the pinion angle calculation circuit 54. The pinion angle feedback control circuit 63 performs proportional-integral-derivative (PID) control as feedback control of the pinion angle so that the actual pinion angle $\theta_p$ follows the target pinion angle $\theta_p$*. That is, the pinion angle feedback control circuit 63 obtains a deviation between the target pinion angle $\theta_p$* and the actual pinion angle $\theta_p$ and obtains a correction component $T_{a2}$* (a correction control component) for the basic assist component $T_{a1}$* so as to eliminate the deviation.

The adder 64 calculates the assist command value $T_a$* by adding the correction component $T_{a2}$* to the basic assist component $T_{a1}$*.

A configuration may be provided which increases the tuning range of target steering characteristics or a steering feel or which optimizes hysteresis characteristics during steering. The assist command value calculation circuit 51 includes, as this configuration, a steering angle calculation circuit 65, a hysteresis controlled variable calculation circuit 66, and a subtractor 67.

The steering angle calculation circuit 65 calculates an actual steering angle $\theta_s$ of the steering wheel 21 based on the rotation angle $\theta_m$ of the motor 31. The steering angle calculation circuit 65 calculates the steering angle $\theta_s$ by using the correlation between the rotation angle $\theta_m$ of the motor 31 and the rotation angle of the steering shaft 22. The steering angle $\theta_s$ is zero when the steering wheel 21 is located at a neutral position. The steering angle $\theta_s$ has a positive value when the steering wheel 21 is operated to the right with respect to the neutral position, and has a negative value when the steering wheel 21 is operated to the left with respect to the neutral position.

The hysteresis controlled variable calculation circuit 66 receives the steering angle $\theta_s$ calculated by the steering angle calculation circuit 65 and the vehicle speed V detected by the vehicle speed sensor 410. The hysteresis controlled variable calculation circuit 66 calculates a final hysteresis controlled variable $T_{hy}$* by calculating a basic hysteresis controlled variable $T_{hy}$* based on the steering angle $\theta_s$ and multiplying the basic hysteresis controlled variable $T_{hy}$* by a gain according to the vehicle speed V. The hysteresis controlled variable $T_{hy}$* is a correction component having hysteresis characteristics with respect to a change in steering angle $\theta_s$.

Figure 4:
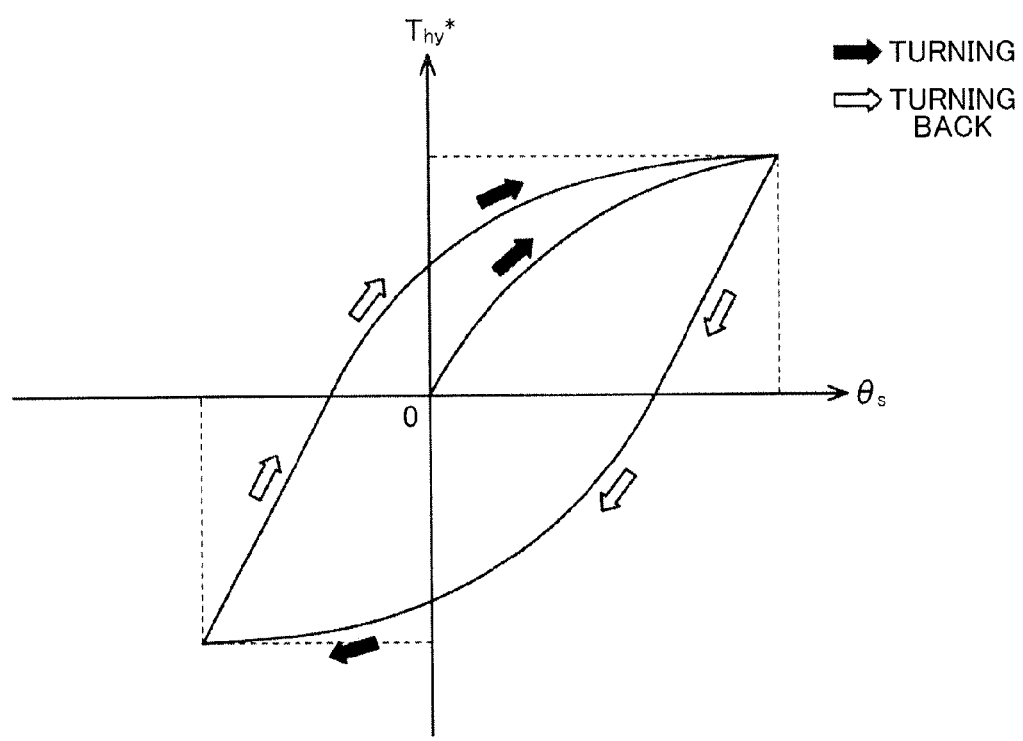
FIG. 4 is a graph showing the relationship between the steering angle and the hysteresis controlled variable.

As shown in the graph of FIG. 4, the hysteresis controlled variable $T_{hy}^*$ increases in the same direction as the steering angle $\theta_s$ when the steering wheel 21 is turned from the neutral position ($\theta_s=0$), and increases in the opposite direction from that of the steering angle $\theta_s$ when the steering wheel 21 is turned back toward the neutral position. The hysteresis controlled variable $T_{hy}^*$ is calculated so as to provide a steering reaction force having a hysteresis suitable for driver's steering operation in order to give the driver a smooth steering feel.

Referring back to FIG. 2, the subtractor 67 generates a final basic assist component $T_{a1}^*$ by subtracting the hysteresis controlled variable $T_{hy}^*$ from the basic assist component $T_{a1}^*$. In this case, the target pinion angle calculation circuit 62 calculates the target pinion angle $\theta_p^*$ by using the final basic assist component $T_{a1}^*$. The adder 64 calculates the assist command value $T_a^*$ by adding the correction component $T_{a2}^*$ to the final basic assist component $T_{a1}^*$.

The assist command value $T_a^*$ and thus the current command value I* decreases by the amount corresponding to the hysteresis controlled variable $T_{hy}^*$ subtracted from the basic assist component $T_{a1}^*$. That is, since the hysteresis controlled variable $T_{hy}^*$ is subtracted, a steering assist force (assist force) to be applied to the steering shaft 22 decreases accordingly. Since the steering torque $T_h$ required to operate the steering wheel 21 increases by the amount corresponding to subtraction of the hysteresis controlled variable $T_{hy}^*$, a steering feel according to the hysteresis controlled variable $T_{hy}^*$ can be given to the driver.

The target pinion angle calculation circuit 62 will be described in detail. As described above, the target pinion angle calculation circuit 62 calculates the target pinion angle $\theta_p^*$ from the basic drive torque based on the ideal model. The basic drive torque is the sum of the final basic assist component $T_{a1}^*$ and the steering torque $T_h$. The ideal model is a model based on the fact that the torque to be applied to the steering shaft 22, i.e., the basic drive torque $T_p^*$ described above, is given by the following Formula (1).

$$T_p^* = Jp\theta_p^{*\prime\prime} + C\theta_p^{*\prime} + K\theta_p^* \quad (1)$$

where Jp represents the moment of inertia of the steering wheel 21 and the steering shaft 22, C represents the coefficient of viscosity (the coefficient of friction) corresponding to friction against a housing of the rack shaft 23 etc., and K represents a coefficient of spring in the case where each of the steering wheel 21 and the steering shaft 22 is regarded as a spring.

As can be seen from Formula (1), the basic drive torque $T_p^*$ is obtained by adding a second-order time differential value $\theta_p^{*\prime\prime}$ of the target pinion angle $\theta_p^*$ multiplied by the moment of inertia Jp, a first-order time differential value $\theta_p^{*\prime}$ of the target pinion angle $\theta_p^*$ multiplied by the coefficient of viscosity C, and the target pinion angle $\theta_p^*$ multiplied by the coefficient of spring K.

Figure 3:
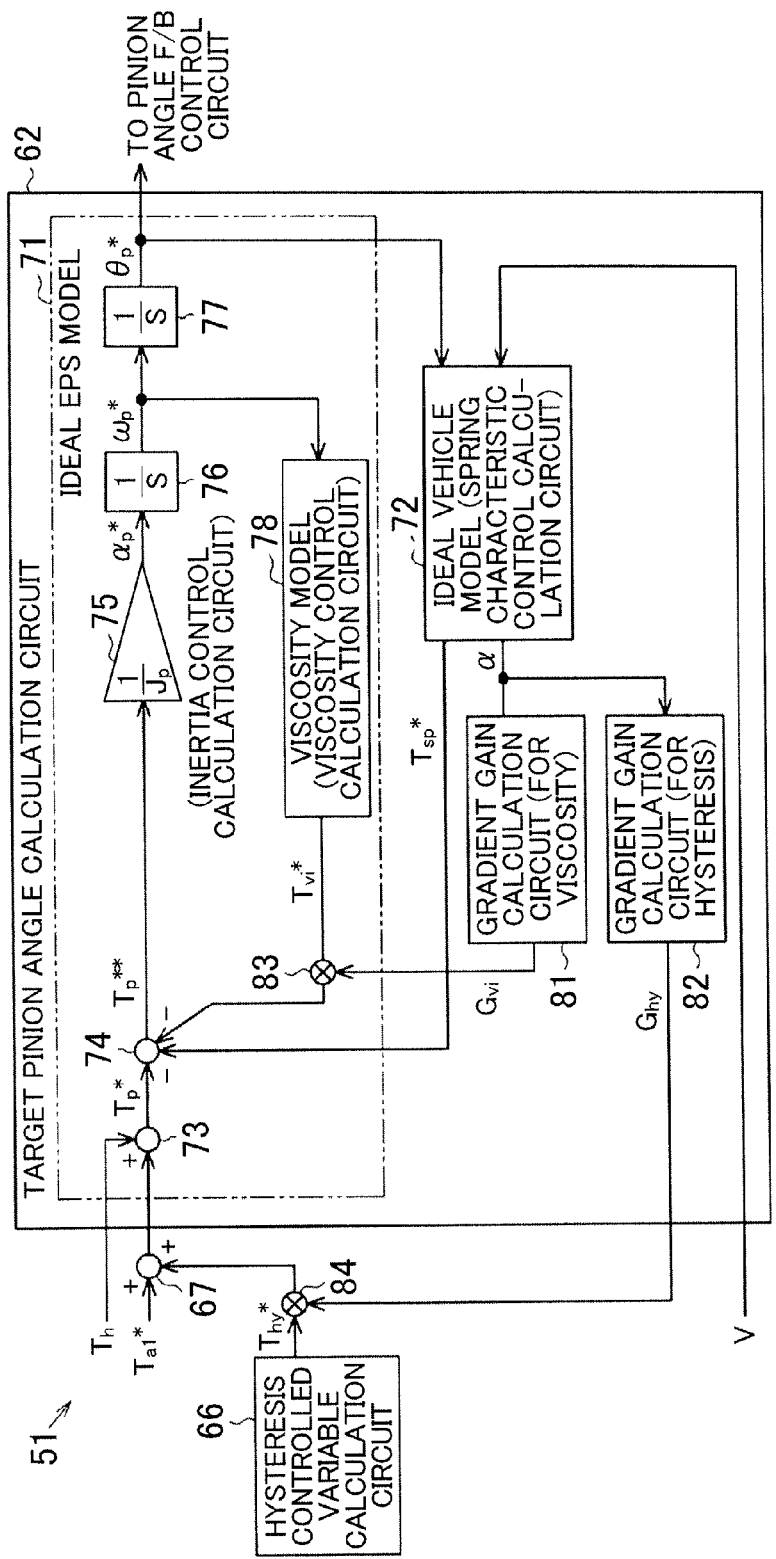
FIG. 3 is a control block diagram of a target pinion angle calculation circuit in a first embodiment of the EPS.

The target pinion angle calculation circuit 62 calculates the target pinion angle $\theta_p^*$ according to the ideal model based on Formula (1). As shown in FIG. 3, the ideal model based on Formula (1) includes an ideal EPS model 71 and an ideal vehicle model 72.

The ideal EPS model 71 is tuned according to characteristics of each component of the electric power steering system 10 such as the steering shaft 22 and the motor 31. The ideal EPS model 71 has an adder 73, a subtractor 74, an inertia model 75, a first integrator 76, a second integrator 77, and a viscosity model 78.

The adder 73 calculates the basic drive torque $T_p^*$ by adding the final basic assist component $T_{a1}^*$ and the steering torque $T_h$. The subtractor 74 subtracts a viscosity component $T_{vi}^*$ and a spring component $T_{sp}^*$, which will be described later, from the basic drive torque $T_p^*$ calculated by the adder 73. The basic drive torque $T_p^*$ minus the viscosity component $T_{vi}^*$ and the spring component $T_{sp}^*$ is herein referred to as the subtraction value $T_p^{**}$.

The inertia model 75 functions as an inertia control calculation circuit corresponding to the inertial term of Formula (1). The inertia model 75 calculates pinion angular acceleration $\alpha_p^*$ by multiplying the subtraction value $T_p^{**}$ calculated by the subtractor 74 by the reciprocal of the moment of inertia Jp.

The first integrator 76 calculates a pinion angular velocity $\omega_p^*$ by integrating the pinion angular acceleration $\alpha_p^*$ calculated by the inertia model 75. The second integrator 77 calculates a target pinion angle $\theta_p^*$ by integrating the pinion angular velocity $\omega_p^*$ calculated by the first integrator 76. The target pinion angle $\theta_p^*$ is an ideal rotation angle of the pinion shaft 22c based on the ideal EPS model 71.

The viscosity model 78 functions as a viscosity control calculation circuit corresponding to the viscosity term of Formula (1). The viscosity model 78 calculates the viscosity component $T_{vi}^*$ of the basic drive torque $T_p^*$ by multiplying the pinion angular velocity $\omega_p^*$ calculated by the first integrator 76 by the coefficient of viscosity C. The viscosity component $T_{vi}^*$ is one of steering reaction force components (reaction force components to be applied to steering) according to the pinion angular velocity $\omega_p^*$.

The viscosity model 78 may calculate the viscosity component $T_{vi}^*$ according to the absolute value of the pinion angular velocity $\omega_p^*$, based on a control map that defines the relationship between the absolute value of the pinion angular velocity $\omega_p^*$ and the viscosity component $T_{vi}^*$. This control map is obtained in advance by experiments etc. according to required steering characteristics etc.

Figure 5:
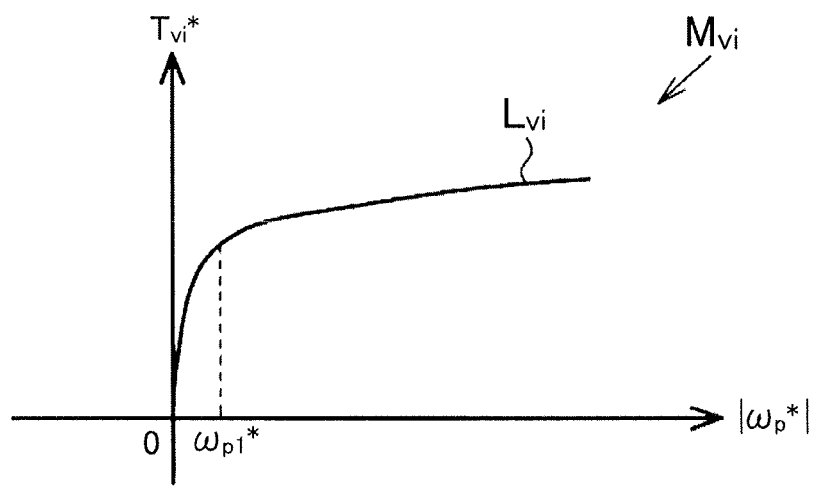
FIG. 5 is a graph showing the relationship between the absolute value of a pinion angular velocity and the viscosity component.

As shown in the graph of FIG. 5, a control map $M_{vi}$ obtained by plotting the absolute value of the pinion angular velocity $\omega_p^*$ on the abscissa and plotting the viscosity component $T_{vi}^*$ on the ordinate has the following characteristics. When the absolute value of the pinion angular velocity $\omega_p^*$ increases from zero to a certain value $\omega_{p1}^*$, the value of the viscosity component $T_{vi}^*$ increases rapidly with an increase in absolute value of the pinion angular velocity $\omega_p^*$. After the absolute value of the pinion angular velocity $\omega_p^*$ reaches the certain value $\omega_{p1}^*$, the value of the viscosity component $T_{vi}^*$ increases gently with an increase in absolute value of the pinion angular velocity $\omega_p^*$. The rate of change in viscosity component $T_{vi}^*$ with respect to the absolute value of the pinion angular velocity $\omega_p^*$ (the slope of a tangent to a characteristic line $L_{vi}$ shown in FIG. 5) decreases as the absolute value of the pinion angular velocity $\omega_p^*$ increases.

Referring back to FIG. 3, the ideal vehicle model 72 is tuned according to characteristics of the vehicle on which the electric power steering system 10 is mounted. Characteristics of the vehicle which affect steering characteristics are determined by, e.g., the specifications of suspension and wheel alignment, the grip (frictional force) of the steered wheels 26, 26, etc. The ideal vehicle model 72 functions as a spring characteristic control calculation circuit corresponding to the spring term of Formula (1). The ideal vehicle model 72 calculates the spring component $T_{sp}^*$ of the basic drive torque $T_p^*$ by multiplying the target pinion angle $\theta_p^*$ calculated by the second integrator 77 by the coefficient of spring K. The spring component $T_{sp}^*$ is one of the steering reaction force components according to the target pinion angle $\theta_p^*$. The ideal vehicle model 72 may also use the vehicle speed V to calculate the spring component $T_{sp}^*$.

The ideal vehicle model 72 may calculate the spring component $T_{sp}^*$ according to the absolute value of the target pinion angle $\theta_p^*$, based on a control map that defines the relationship between the absolute value of the target pinion angle $\theta_p^*$ and the spring component $T_{sp}^*$. This control map is obtained in advance by experiments etc. according to required steering characteristics etc.

Figure 6:
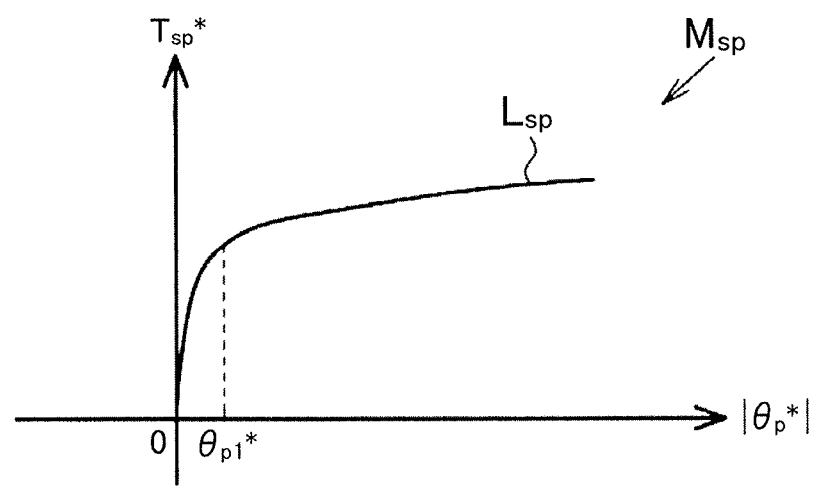
FIG. 6 is a graph showing the relationship between the absolute value of a target pinion angle and the spring component.

As shown in the graph of FIG. 6, a control map $M_{sp}$ obtained by plotting the absolute value of the target pinion angle $\theta_p^*$ on the abscissa and plotting the spring component $T_{sp}^*$ on the ordinate has the following characteristics. When the absolute value of the target pinion angle $\theta_p^*$ increases from zero to a certain value $\theta_{p1}^*$, the value of the spring component $T_{sp}^*$ increases rapidly with an increase in absolute value of the target pinion angle $\theta_p^*$. After the absolute value of the target pinion angle $\theta_p^*$ reaches the certain value $\theta_{p1}^*$, the value of the spring component $T_{sp}^*$ increases gently with an increase in absolute value of the target pinion angle $\theta_p^*$. The rate of change in spring component $T_{sp}^*$ with respect to the absolute value of the target pinion angle $\theta_p^*$ (the slope of a tangent to a characteristic line $L_{sp}$ shown in FIG. 6) decreases as the absolute value of the target pinion angle $\theta_p^*$ increases. The ideal vehicle model 72 also calculates a gradient $\alpha$ of the tangent to the characteristic line $L_{sp}$ when calculating the spring component $T_{sp}^*$.

The target pinion angle calculation circuit 62 configured as described above can directly tune the relationship between the basic drive torque $T_p^*$ and the target pinion angle $\theta_p^*$ and thus implement desired steering characteristics by adjusting the moment of inertia Jp and the coefficient of viscosity C of the ideal EPS model 71 and the coefficient of spring K of the ideal vehicle model 72.

In this example, the target pinion angle $\theta_p^*$ is set from the basic drive torque $T_p^*$ based on the ideal EPS model 71 and the ideal vehicle model 72, and the actual pinion angle $\theta_p$ is feedback controlled so as to match the target pinion angle $\theta_p^*$. As described above, there is a correlation between the pinion angle $\theta_p$ and the steered angle $\theta_{ta}$ of the steered wheels 26, 26. Accordingly, the steering operation of the steered wheels 26, 26 according to the basic drive torque $T_p^*$ is also determined by the ideal EPS model 71 and the ideal vehicle model 72. That is, the steering feel of the vehicle is determined by the ideal EPS model 71 and the ideal vehicle model 72. A desired steering feel can therefore be achieved by adjusting the ideal EPS model 71 and the ideal vehicle model 72.

The actual steered angle $\theta_{ta}$ is maintained at the steered angle $\theta_{ta}$ according to the target pinion angle $\theta_p^*$. This also restrains reverse input vibration that is caused by disturbance such as the road surface condition or braking. That is, even if vibration is transmitted to the steering mechanism 20 via the steered wheels 26, 26, the correction component $T_{a2}^*$ (see FIG. 2) is adjusted so that the pinion angle $\theta_p$ becomes equal to the target pinion angle $\theta_p^*$. Accordingly, the actual steered angle $\theta_{ta}$ is maintained at the steered angle $\theta_{ta}$ according to the target pinion angle $\theta_p^*$ that is defined by the ideal model. Steering is thus assisted in such a direction that reverse input vibration is cancelled, which restrains transmission of the reverse input vibration to the steering wheel 21.

Since the spring term and the viscosity term in Formula (1), i.e., the spring component $T_{sp}^*$ and the viscosity component $T_{vi}^*$ described above, are determined independently of each other, the following problem may occur. In a region where the target pinion angle $\theta_p^*$ is small (e.g., smaller than the certain value $\theta_{p1}^*$ in the graph of FIG. 6), a strong spring reaction force may be generated based on the spring component $T_{sp}^*$, and a weak viscosity reaction force (damping) is generated based on the viscosity component $T_{vi}^*$ accordingly. In a region where the target pinion angle $\theta_p^*$ is large (e.g., equal to or larger than the certain value $\theta_{p1}^*$ in the graph of FIG. 6), a weak spring reaction force may be generated based on the spring component $T_{sp}^*$, and a strong viscosity reaction force may be generated based on the viscosity component $T_{vi}^*$ accordingly.

The balance between the spring component $T_{sp}^*$ (the spring reaction force) and the viscosity component $T_{vi}^*$ (the viscosity reaction force) is required in order to maintain and improve driver's steering feel. For example, if a strong viscosity reaction force is generated while almost no spring reaction force is generated, the driver more strongly feels viscosity as a change in steering torque. On the contrary, if the spring reaction force is very strong, the driver is less likely to feel viscosity as a change in steering torque. For example, a more appropriate steering feel (responsive feel) can be achieved if the viscosity reaction force can be adjusted according to the spring reaction force depending on whether the spring reaction force is strong or weak. There is an appropriate viscosity component $T_{vi}^*$ according to the gradient (slope) of the tangent to the characteristic line $L_{sp}$ shown in the graph of FIG. 6, namely the characteristic line showing a change in spring component $T_{sp}^*$ with respect to a change in absolute value of the target pinion angle $\theta_p^*$.

The same applies to the hysteresis controlled variable $T_{hy}^*$. That is, the stronger the spring reaction force based on the spring component $T_{sp}^*$ is, the less the driver feels the steering reaction force based on the hysteresis controlled variable $T_{hy}^*$ as friction. On the contrary, the weaker the spring reaction force based on the spring component $T_{sp}^*$ is, the more the driver feels the steering reaction force based on the hysteresis controlled variable $T_{hy}^*$ as friction. Thus, a feel of friction according to the steering reaction force based on the hysteresis controlled variable $T_{hy}^*$ is also determined by the balance with the magnitude of the steering reaction force (the spring reaction force) based on the spring term.

Figure 7:
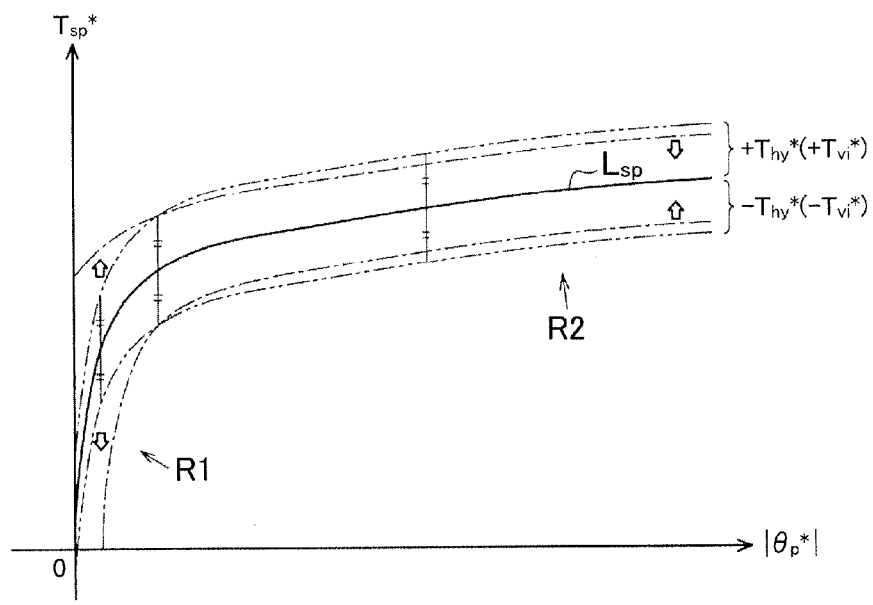
FIG. 7 is a graph showing a concept in the case of adding the hysteresis controlled variable to the spring component.

An example will be described in which positive and negative hysteresis controlled variables $+T_{hy}^*, -T_{hy}^*$ having the same absolute value are added to the spring component $T_{sp}^*$ shown by the characteristic line $L_{sp}$ regardless of the absolute value of the target pinion angle $\theta_p^*$ as shown in the graph of FIG. 7. In this case, it seems that smaller hysteresis controlled variables $+T_{hy}^*, -T_{hy}^*$ are added as the absolute value of the target pinion angle $\theta_p^*$ decreases. It also seems that larger hysteresis controlled variables $+T_{hy}^*, -T_{hy}^*$ are added as the absolute value of the target pinion angle $\theta_p^*$ increases.

This is because the smaller the absolute value of the target pinion angle $\theta_p^*$ is, the larger the gradient of the tangent to the characteristic line $L_{sp}$ at this absolute value is. That is, the larger the gradient of the tangent to the characteristic line $L_{sp}$ is, the more the spring component $T_{sp}^*$ increases with a change in absolute value of the target pinion angle $\theta_p^*$. The driver therefore more strongly feels the spring reaction force based on the spring component $T_{sp}^*$ as a change in steering torque. Accordingly, the larger the gradient of the tangent to the characteristic line $L_{sp}$ is, the less the driver feels the steering reaction force based on the hysteresis controlled variable $T_{hy}^*$ as friction. The smaller the gradient of the tangent to the characteristic line $L_{sp}$ is, the more the driver feels the steering reaction force based on the hysteresis controlled variable $T_{hy}^*$ as friction.

Accordingly, if the hysteresis controlled variable $T_{hy}*$ can be adjusted according to the magnitude of the spring reaction force, namely according to the gradient of the tangent to the characteristic line $L_{sp}$, a more appropriate steering feel (feel of friction) can be given to the driver. There is a more appropriate hysteresis controlled variable $T_{hy}*$ according to the gradient of the tangent to the characteristic line $L_{sp}$ shown in the graph of FIG. 7. The same applies to the case where positive and negative viscosity components $+T_{vi}*$, $-T_{vi}*$ are added to the spring component $T_{sp}*$ shown by the characteristic line $L_{sp}$.

In this example, the values of the hysteresis controlled variable $T_{hy}*$ and the viscosity component $T_{vi}*$ are changed according to the gradient (slope) of the tangent to the characteristic line $L_{sp}$, namely the characteristic line showing a change in spring component $T_{sp}*$ with respect to a change in absolute value of the target pinion angle $\theta_p*$. By changing the values of the hysteresis controlled variable $T_{hy}*$ and the viscosity component $T_{vi}*$ according to the gradient of the tangent to the characteristic line $L_{sp}$, the balance between the steering reaction force based on the hysteresis controlled variable $T_{hy}*$ and the spring reaction force and the balance between the viscosity reaction force and the spring reaction force are adjusted to appropriate balances, whereby a more appropriate steering feel can be given to the driver. Specifically, the following configuration is provided in the target pinion angle calculation circuit 62.

As shown in FIG. 3, the target pinion angle calculation circuit 62 has two gradient gain calculation circuits 81, 82 and a multiplier 83. The assist command value calculation circuit 51 has a multiplier 84.

The gradient gain calculation circuit 81 receives the gradient (slope) $\alpha$ of the tangent to the characteristic line $L_{sp}$ at every predetermined sampling period from the ideal vehicle model 72 and calculates a gain $G_{vi}$ according to the received tangent gradient $\alpha$. This gain $G_{vi}$ is used to adjust the viscosity component $T_{vi}*$.

The gradient gain calculation circuit 82 receives the gradient (slope) $\alpha$ of the tangent to the characteristic line $L_{sp}$ at every predetermined sampling period from the ideal vehicle model 72 and calculates a gain $G_{hy}$ according to the received tangent gradient $\alpha$. This gain $G_{hy}$ is used to adjust the hysteresis controlled variable $T_{hy}*$.

The multiplier 83 multiplies the viscosity component $T_{vi}*$ calculated by the viscosity model 78 by the gain $G_{vi}$ calculated by the gradient gain calculation circuit 81.

The multiplier 84 multiplies the hysteresis controlled variable $T_{hy}*$ calculated by the hysteresis controlled variable calculation circuit 66 by the gain $G_{hy}$ calculated by the gradient gain calculation circuit 82.

The gradient gain calculation circuit 81 calculates the gain $G_{vi}$ based on a gain map $MG_{vi}$ that defines the relationship between the tangent gradient $\alpha$ and the gain $G_{vi}$. The gain map $MG_{vi}$ is obtained in advance by experiments or simulation according to required steering characteristics etc.

Figure 8:
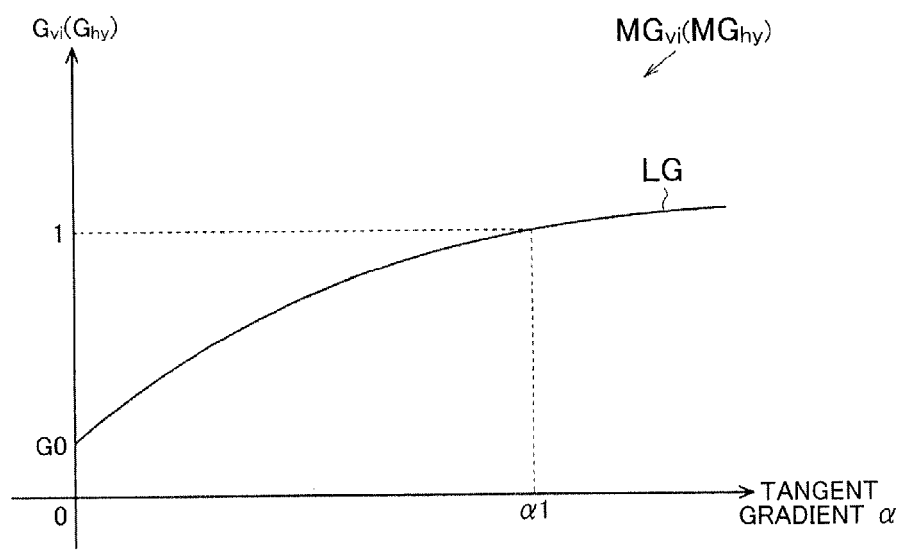
FIG. 8 is a graph showing the relationship between the characteristic gradient of the spring component and the gain.

As shown in the graph of FIG. 8, the gain map $MG_{vi}$ obtained by plotting the tangent gradient $\alpha$ on the abscissa and plotting the gain $G_{vi}$ on the ordinate has the following characteristics. The gain $G_{vi}$ increases like a curve from an initial value G0 as a starting point as the tangent gradient $\alpha$ increases from zero as a starting point. The rate of change in gain $G_{vi}$ (the slope of the tangent to a characteristic line LG shown by a continuous line in FIG. 8) decreases as the tangent gradient $\alpha$ increases. Although the initial value G0 (absolute value) is set to any value as appropriate, the initial value G0 may be, e.g., a value larger than zero and smaller than one. In this case, the gain map $MG_{vi}$ may be set so that the gain $G_{vi}$ is larger than one when the tangent gradient $\alpha$ is larger than a gradient threshold $\alpha 1$.

The initial value G0 (absolute value) may be set to a value equal to or larger than one. The gain map $MG_{vi}$ may be set so that the gain $G_{vi}$ increases linearly from the initial value G0 as a starting point with an increase in the tangent gradient $\alpha$.

The gradient gain calculation circuit 82 calculates the gain $G_{hy}$ based on a gain map $MG_{hy}$ that defines the relationship between the tangent gradient $\alpha$ and the gain $G_{hy}$. This gain map $MG_{hy}$ has characteristics similar to those of the gain map $MG_{vi}$. Accordingly, for the gain map $MG_{hy}$, reference characters in parentheses are shown on the abscissa axis and the title in the graph of FIG. 8, and detailed description thereof will be omitted.

Functions of the two gradient gain calculation circuits 81, 82 will be described. The initial values G0 (absolute values) of the gains $G_{vi}$, $G_{hy}$ are larger than zero and smaller than one. When the tangent gradient $\alpha$ is larger than the gradient threshold $\alpha 1$, the gains $G_{vi}$, $G_{hy}$ are larger than one.

As shown in the graph of FIG. 8, the two gains $G_{vi}$, $G_{hy}$ increase with an increase in the tangent gradient $\alpha$. The viscosity component $T_{vi}*$ and the hysteresis controlled variable $T_{hy}*$ are multiplied by the gains $G_{vi}$, $G_{hy}$, respectively. Each of the viscosity component $T_{vi}*$ and the hysteresis controlled variable $T_{hy}*$ thus has a smaller value as the tangent gradient $\alpha$ decreases, and has a larger value as the tangent gradient $\alpha$ increases.

For example, as shown by alternate long and short dash lines in the graph of FIG. 7, in a region R1 where the tangent gradient $\alpha$ is large, namely where the driver is less likely to feel the steering reaction force based on the hysteresis controlled variable $T_{hy}*$ and the viscosity reaction force, a larger viscosity component $T_{vi}*$ and a larger hysteresis controlled variable $T_{hy}*$ are added to the spring component $T_{sp}*$. On the contrary, in a region R2 where the tangent gradient $\alpha$ is small, namely where the driver is more likely to feel the steering reaction force based on the hysteresis controlled variable $T_{hy}*$ and the viscosity reaction force, a smaller viscosity component $T_{vi}*$ and a smaller hysteresis controlled variable $T_{hy}*$ are added to the spring component $T_{sp}*$.

The balance between the steering reaction force based on the hysteresis controlled variable $T_{hy}*$ and the spring reaction force and the balance between the spring reaction force and the viscosity reaction force are thus adjusted to more appropriate balances.

Accordingly, a more appropriate steering feel can be given to the driver. Even when the tangent gradient $\alpha$ is large, the viscosity component $T_{vi}*$ and the hysteresis controlled variable $T_{hy}*$ are increased, and therefore the driver is more likely to feel, as a change in steering torque, a feel of friction according to the steering reaction force based on the hysteresis controlled variable $T_{hy}*$, and the viscosity according to the viscosity reaction force.

Figure 9A:
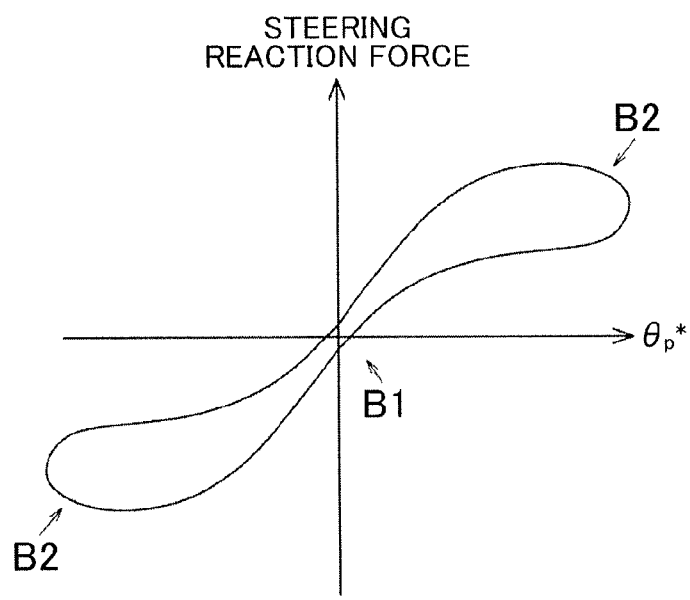
FIG. 9A is a graph showing characteristics of reaction force components before the reaction force components (viscosity component, inertia component, and hysteresis component) except the spring component are added to the target pinion angle.
Figure 9B:
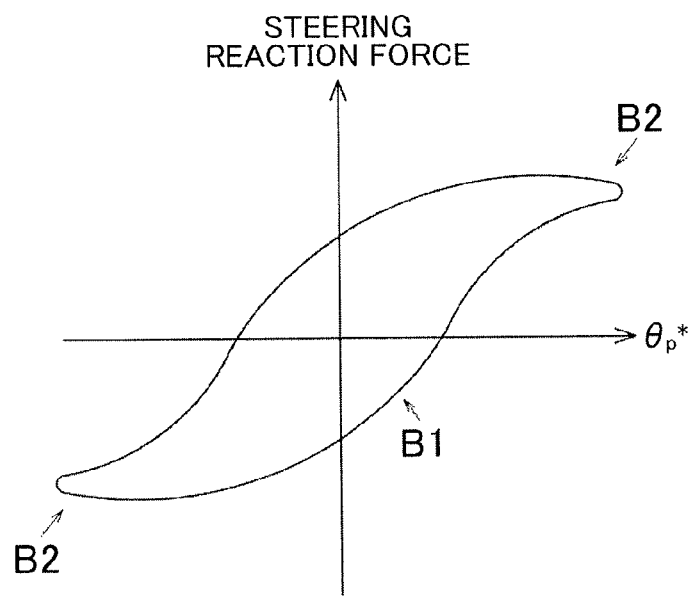
FIG. 9B is a graph showing characteristics of the reaction force components after the reaction force components (viscosity component, inertia component, and hysteresis component) except the spring component are added to the target pinion angle.

For example, characteristics of the steering reaction force based on the hysteresis controlled variable $T_{hy}*$ change from the state shown in the graph of FIG. 9A to the state shown in the graph of FIG. 9B when the hysteresis controlled variable $T_{hy}*$ is multiplied by the gain $G_{hy}$. The graphs of FIGS. 9A and 9B show the relationship between the target pinion angle $\theta_p*$ and the steering reaction force (the steering reaction force based on the hysteresis controlled variable $T_{hy}*$). The abscissa represents the target pinion angle $\theta_p*$, and the ordinate represents the steering reaction force.

As in the case where the hysteresis controlled variable $T_{vi}*$ is multiplied by the gain $G_{vi}$, the characteristics of the steering reaction force change from the state shown in the graph of FIG. 9A to the state shown in the graph of FIG. 9B when the viscosity component $T_{vi}*$ is multiplied by the gain $G_{vi}$. The characteristics of the steering reaction force based on the hysteresis controlled variable $T_{hy}*$ will be described below by way of example.

As shown in the graph of FIG. 9A, in the case where the hysteresis controlled variable $T_{hy}*$ is not multiplied by the gain $G_{hy}$, the hysteresis width in a region B1 (the central region in the graph) where the absolute value of the target pinion angle $\theta_p*$ is small is narrower than that in regions B2 (both end regions in the graph) where the absolute value of the target pinion angle $\theta_p*$ is large. The hysteresis width represents the magnitude of the steering reaction force. Accordingly, the driver is less likely to feel a feel of friction according to the steering reaction force based on the hysteresis controlled variable $T_{hy}*$ in the region B1, and is more likely to feel this feel of friction in the regions B2. Similarly, in the case where the viscosity component $T_{vi}*$ is not multiplied by the gain $G_{vi}$, the driver is less likely to feel a feel of viscosity the steering reaction force based on the viscosity component $T_{vi}*$ in the region B1, and is more likely to feel this feel of viscosity in the regions B2.

As shown in the graph of FIG. 9B, in the case where the hysteresis controlled variable $T_{hy}*$ is multiplied by the gain $G_{hy}$, the hysteresis width in the region B1 where the absolute value of the target pinion angle $\theta_p*$ is small increases according to the value of the gain $G_{hy}$. On the contrary, the hysteresis width in the regions B2 (both end regions in the graph) where the absolute value of the target pinion angle $\theta_p*$ is large decreases according to the value of the gain $G_{hy}$. The driver is therefore more likely to feel the steering reaction force based on the hysteresis controlled variable $T_{hy}*$ in the region B1 and is less likely to feel the steering reaction force based on the hysteresis controlled variable $T_{hy}*$ in the regions B2, as compared to the case where the hysteresis controlled variable $T_{hy}*$ is not multiplied by the gain $G_{hy}$. Similarly, in the case where the viscosity component $T_{vi}*$ is multiplied by the gain $G_{vi}$, the driver is more likely to feel a feel of viscosity according to the steering reaction force based on the viscosity component $T_{vi}*$ in the region B1, and is less likely to feel this feel of viscosity in the regions B2.

The balance between the steering reaction force based on the hysteresis controlled variable $T_{hy}*$ and the spring reaction force and the balance between the viscosity reaction force based on the viscosity component $T_{vi}*$ and the spring reaction force are thus adjusted to more appropriate balances in the central region (the region where the gradient of the tangent to the characteristic line $L_{sp}$ is large) and the end regions (the regions where the gradient of the tangent to the characteristic line $L_{sp}$ is small) in the graph of FIG. 9B.

The present embodiment can provide the following advantageous effects.

(1) The values of the hysteresis controlled variable $T_{hy}*$ and the viscosity component $T_{vi}*$ are changed according to the gradient (slope) α of the tangent to the characteristic line $L_{sp}$ showing a change in spring component $T_{sp}*$ with respect to a change in absolute value of the target pinion angle $\theta_p*$. By changing the values of the hysteresis controlled variable $T_{hy}*$ and the viscosity component $T_{vi}*$ according to the gradient α of the tangent to the characteristic line $L_{sp}$, the balance between the spring reaction force based on the spring component $T_{sp}*$ and the steering reaction force based on the hysteresis controlled variable $T_{hy}*$ and the balance between the spring reaction force and the viscosity component $T_{vi}*$ are adjusted to more appropriate balances. A more appropriate steering feel can therefore be given to the driver.

(2) A configuration may be used in which only one of the hysteresis controlled variable $T_{hy}*$ and the viscosity component $T_{vi}*$ is corrected according to the gradient α of the tangent to the characteristic line $L_{sp}$ showing a change in spring component $T_{sp}*$. In this case as well, the driver tends to feel a feel of friction based on the hysteresis controlled variable $T_{hy}*$ or a feel of viscosity based on the viscosity component $T_{vi}*$. This is because the hysteresis width in the region B1 where the target pinion angle $\theta_p*$ is small (see FIGS. 9A and 9B) increases according to the hysteresis controlled variable $T_{hy}*$ or the viscosity component $T_{vi}*$.

(3) A configuration may be used in which, in addition to the hysteresis controlled variable $T_{hy}*$ and the viscosity component $T_{vi}*$, the pinion angular acceleration $\alpha_p*$ calculated by the inertia model 75 is corrected according to the tangent gradient α. In this case, a gradient gain calculation circuit for the inertia model (not shown) is provided, and the pinion angular acceleration $\alpha_p*$ calculated by the inertia model 75 is multiplied by a gain calculated by this gradient gain calculation circuit.

A second embodiment of the electric power steering system will be described. This example is different from the first embodiment in the configuration of the target pinion angle calculation circuit 62. This example may be carried out either independently or in combination with the first embodiment.

As shown in FIG. 10, the target pinion angle calculation circuit 62 (to be exact, the ideal EPS model 71) includes another viscosity model 91 in addition to the viscosity model 78. Like the viscosity model 78, the viscosity model 91 calculates the viscosity component $T_{vi}*$ of the basic drive torque $T_p*$ by multiplying the pinion angular velocity $\omega_p*$ calculated by the first integrator 76 by the coefficient of viscosity C.

The target pinion angle calculation circuit 62 has a hysteresis controlled variable calculation circuit 92 and an adder 93. Like the hysteresis controlled variable calculation circuit 66, the hysteresis controlled variable calculation circuit 92 calculates a basic hysteresis controlled variable $T_{hy}*$ based on the steering angle $\theta_s$, and calculates a final hysteresis controlled variable $T_{hy}*$ by multiplying the basic hysteresis controlled variable $T_{hy}*$ by a gain according to the vehicle speed V.

The adder 93 adds the viscosity component $T_{vi}*$ calculated by the viscosity model 91 and the hysteresis controlled variable $T_{hy}*$ calculated by the hysteresis controlled variable calculation circuit 92 to the target pinion angle $\theta_p*$ calculated by the second integrator 77.

The ideal vehicle model 72 calculates the spring component $T_{sp}*$ of the basic drive torque $T_p*$ by using the target pinion angle $\theta_p*$ to which the viscosity component $T_{vi}*$ and the hysteresis controlled variable $T_{hy}*$ have been added.

The following functions can be provided by calculating the spring component $T_{sp}*$ by using the target pinion angle $\theta_p*$ to which the viscosity component $T_{vi}*$ and the hysteresis controlled variable $T_{hy}*$ have been added.

Figure 11:
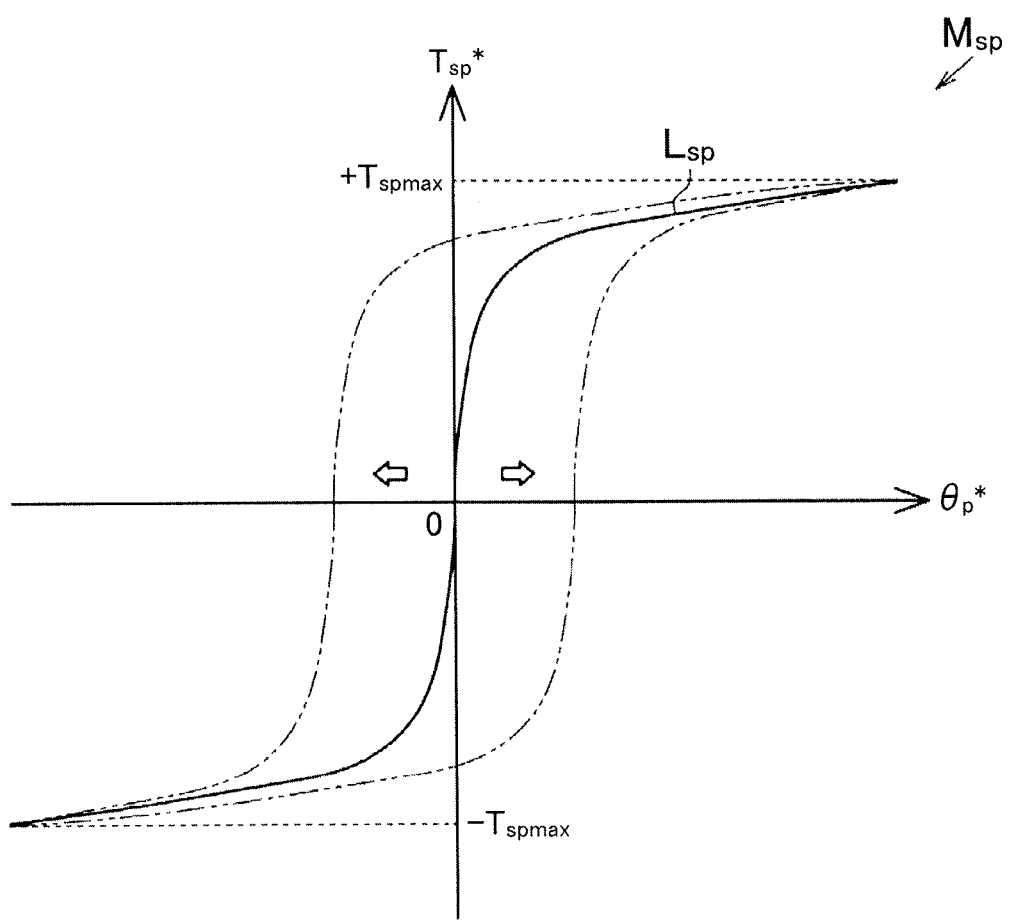
FIG. 11 is a graph showing the relationship between the target pinion angle and the spring component at the time the reaction force components (viscosity component, inertia component, and hysteresis component) except the spring component are added to the target pinion angle.

For example, the spring component $T_{sp}*$ has the following characteristics according to the sum of the viscosity component $T_{vi}*$ and the hysteresis controlled variable $T_{hy}*$ which are added to the target pinion angle $\theta_p*$. As shown by long dashed double-short dashed lines in the graph of FIG. 11, the characteristic line $L_{sp}$ showing the relationship between the target pinion angle $\theta_p*$ and the spring component $T_{sp}*$ is updated so as to move along the abscissa axis according to the sum of the viscosity component $T_{vi}*$ and the hysteresis controlled variable $T_{hy}^*$. When the sum of the viscosity component $T_{vi}^*$ and the hysteresis controlled variable $T_{hy}^*$ is positive, the characteristic line $L_{sp}$ is updated so as to move in the positive direction along the abscissa axis. When the sum of the viscosity component $T_{vi}^*$ and the hysteresis controlled variable $T_{hy}^*$ is negative, the characteristic line $L_{sp}$ is updated so as to move in the negative direction along the abscissa axis. The positive and negative maximum values $+T_{spmax}$, $-T_{spmax}$ of the spring component $T_{sp}^*$ with respect to a change in target pinion angle $\theta_p^*$ are maintained at constant values regardless of the target pinion angle $\theta_p^*$.

Accordingly, the spring component $T_{sp}^*$ has a hysteresis in the direction along the abscissa axis with respect to a change in target pinion angle $\theta_p^*$. Since the positive and negative maximum values $+T_{spmax}$, $-T_{spmax}$ of the spring component $T_{sp}^*$ do not change according to the target pinion angle $\theta_p^*$, the hysteresis width in the direction along the abscissa axis is larger in the central region including the origin of the control map $M_{sp}$, namely in the region where the target pinion angle $\theta_p^*$ is smaller and the gradient $\alpha$ of the tangent to the characteristic line $L_{sp}$ is larger.

Since the spring component $T_{sp}^*$ has a hysteresis in the direction along the abscissa axis with respect to a change in target pinion angle $\theta_p^*$, the gradient $\alpha$ of the tangent to the characteristic line $L_{sp}$ becomes gentler in the region where the target pinion angle $\theta_p^*$ is small. Since the tangent gradient $\alpha$ becomes gentler, the driver is more likely to feel a feel of viscosity based on the viscosity component $T_{vi}^*$ and a feel of friction according to the steering reaction force based on the hysteresis controlled variable $T_{hy}^*$.

The characteristics of the steering reaction force based on the hysteresis controlled variable $T_{hy}^*$ can also be changed from the state shown in the graph of FIG. 9A to the state shown in the graph of FIG. 9B by adding the hysteresis controlled variable $T_{hy}^*$ to the target pinion angle $\theta_p^*$ that is used by the ideal vehicle model 72. Similarly, in the case where the viscosity component $T_{vi}^*$ is added to the target pinion angle $\theta_p^*$ that is used by the ideal vehicle model 72, the characteristics of the steering reaction force (the viscosity reaction force) based on the viscosity component $T_{vi}^*$ can be changed from the state shown in the graph of FIG. 9A to the state shown in the graph of FIG. 9B.

This example may be modified and carried out as follows. As shown by long dashed double-short dashed lines in FIG. 10, the target pinion angle calculation circuit 62 (the ideal EPS model 71) includes another inertia model 94 in addition to the inertia model 75. Like the inertia model 75, the inertia model 94 calculates the pinion angular acceleration $\alpha_p^*$ by multiplying the subtraction value $T_p^{**}$ calculated by the subtractor 74 by the reciprocal of the moment of inertia Jp. The adder 93 adds, in addition to the viscosity component $T_{vi}^*$ and the hysteresis controlled variable $T_{hy}^*$, the pinion angular acceleration $\alpha_p^*$ calculated by the inertia model 94 to the target pinion angle $\theta_p^*$ calculated by the second integrator 77. Since the pinion angular acceleration $\alpha_p^*$ is added, the hysteresis width of the spring component $T_{sp}^*$ increases in the direction along the abscissa in the graph of FIG. 11.

The present embodiment can provide the following advantageous effects.

(1) Since the viscosity component $T_{vi}^*$ and the hysteresis controlled variable $T_{hy}^*$ are added to the target pinion angle $\theta_p^*$ that is used by the ideal vehicle model 72, the hysteresis width in the region where the target pinion angle $\theta_p^*$ is small increases accordingly. Therefore, in the region where the target pinion angle $\theta_p^*$ is small, the driver is more likely to feel a feel of viscosity according to the viscosity reaction force based on the viscosity component $T_{vi}^*$ and a feel of friction according to the steering reaction force based on the hysteresis controlled variable $T_{hy}^*$. Accordingly, a smoother or more stable steering feel can be given to the driver.

(2) In the case of carrying out this example independently, the two gradient gain calculation circuits 81, 82 and the two multipliers 83, 84 shown in FIG. 3 may be omitted because it is not necessary to multiply the viscosity component $T_{vi}^*$ by the gain $G_{vi}$ and to multiply the hysteresis controlled variable $T_{hy}^*$ by the gain $G_{hy}$.

(3) In the case of carrying out this example in combination with the first embodiment, a more appropriate steering feel can be given to the driver. For example, this example is particularly effective in the case where the gradient $\alpha$ of the tangent to the spring characteristics are set (tuned) to a significantly large value in the control map $M_{sp}$ that defines the relationship between the target pinion angle $\theta_p^*$ and the spring component $T_{sp}^*$.

(4) Even when using the configuration in which only one of the hysteresis controlled variable $T_{hy}^*$ and the viscosity component $T_{vi}^*$ is added to the target pinion angle $\theta_p^*$ that is used by the ideal vehicle model 72, the driver is more likely to feel a feel of friction based on the hysteresis controlled variable $T_{hy}^*$ or a feel of viscosity based on the viscosity component $T_{vi}^*$. This is because the hysteresis width of the spring component $T_{sp}^*$ in the region where the target pinion angle $\theta_p^*$ is small increases according to the hysteresis controlled variable $T_{hy}^*$ or the viscosity component $T_{vi}^*$.

A third embodiment of the electric power steering system will be described. This example relates to a method for calculating the tangent gradient $\alpha$ in the first embodiment.

Required values of other control parameters such as the hysteresis controlled variable $T_{hy}^*$ and the viscosity component $T_{vi}^*$ vary according to the gradient $\alpha$ of the tangent to the characteristic line $L_{sp}$ (the spring component $T_{sp}^*$) in the control map $M_{sp}$ shown in FIG. 6. Accordingly, in the first embodiment, other control parameters such as the hysteresis controlled variable $T_{hy}^*$ and the viscosity component $T_{vi}^*$ are corrected according to the tangent gradient $\alpha$ in order to achieve a more appropriate steering feel.

The tangent gradient $\alpha$ is obtained by dividing a small variation $\Delta T_{sp}^*$ in spring component $T_{sp}^*$ by a small variation $\Delta\theta_p^*$ in target pinion angle $\theta_p^*$. However, in the case where a curve is obtained by using linear interpolation, or a method of linearly interpolating between two points, to calculate the tangent gradient $\alpha$, the obtained curve may not be a smooth continuous curve. For example, the obtained curve may have a bent or may be discontinuous. This is because this method is performed so that the resultant curve is a line segment which passes through the two points and does not take the gradient into consideration.

In the first embodiment, in order to obtain more appropriate gains $G_{vi}$, $G_{hy}$ and thus to give the driver a more appropriate steering feel, it is preferable to obtain such a curve that the gradient $\alpha$ of the tangent to the curve changes more smoothly (to be exact, a curve according to the characteristic line $L_{sp}$ shown in the graph of FIG. 6).

Accordingly, this example uses cubic interpolation. The cubic interpolation is a method for interpolating between two points by using a cubic equation. With the cubic interpolation, a curve that more smoothly connects two points to be interpolated can be obtained as a tangent gradient and a point through which the curve passes are specified.

One type of the cubic interpolation is Hermite interpolation. The Hermite interpolation uses a cubic polynomial given by the following Formula (2). In Formula (2), "·" represents multiplication.

$$y = A3 \cdot x^3 + A2 \cdot x^2 + A1 \cdot x + A0 \qquad (2)$$

When two points (x0, y0), (x1, y1) and gradients (x0, dy0), (x1, dy1) at the two points are specified, a cubic polynomial is determined uniquely. Specifying the gradients can inhibit the obtained curve from being discontinuous.

That is, in the case of the cubic polynomial, there are four unknowns, namely a coefficient A3 of the cubic term, a coefficient A2 of the quadratic term, a coefficient A1 of the linear term, and a constant (coefficient of the zeroth-order term) A0. Four equations are obtained by using the two points (x0, y0), (x1, y1) through which the curve passes and the two gradients (x0, dy0), (x1, dy1). Since there are four equations for the four unknowns, these equations can be solved as simultaneous equations. A cubic polynomial that represents a smooth curve passing through the two points (x0, y0), (x1, y1) and having the two gradients (x0, dy0), (x1, dy1) can be obtained by solving the simultaneous equations. The gradient can be easily obtained by differentiating this cubic polynomial. The gradient can be given by the following Formula (3).

$$\text{Gradient} = 3A3 \cdot x^2 + 2A2 \cdot x + A1 \qquad (3)$$

A coefficient set, namely a set of the coefficient A3 of the cubic term, the coefficient A2 of the quadratic term, the coefficient A1 of the linear term, and the constant (coefficient of the zeroth-order term) A0 in the cubic polynomial from which desired characteristics (e.g., spring characteristics) can be obtained, may be stored for each interval between two target pinion angles $\theta_p^*$ to be sampled.

Figure 12A:
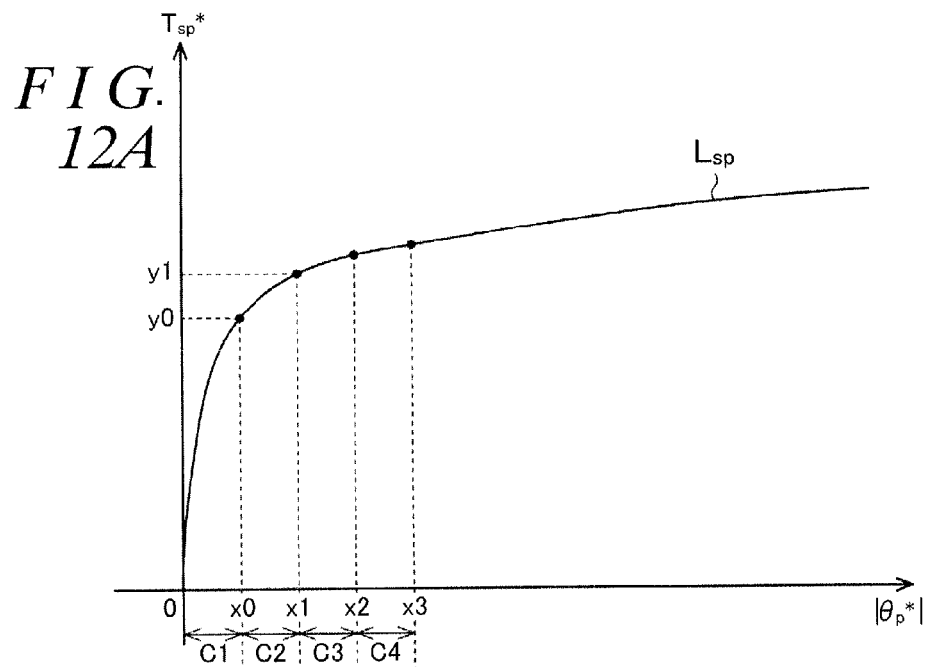
FIG. 12A is a graph showing the relationship between the target pinion angle and the spring component.

For example, as shown in FIG. 12A, the coefficient sets are stored so that a first coefficient set C1 is used when the absolute value of the target pinion angle $\theta_p^*$ is in a first interval (0 to x0), a second coefficient set C2 is used when the absolute value of the target pinion angle $\theta_p^*$ is in a second interval (x0 to x1), a third coefficient set C3 is used when the absolute value of the target pinion angle $\theta_p^*$ is in a third interval (x1 to x2), and a fourth coefficient set C4 is used when the absolute value of the target pinion angle $\theta_p^*$ is in a fourth interval (x2 to x3). The coefficient set is switched as the target pinion angle $\theta_p^*$ changes. Two points corresponding to the interval between the two target pinion angles $\theta_p^*$ that are sampled are thus connected by a more smooth curve according to desired characteristics.

Figure 12B:
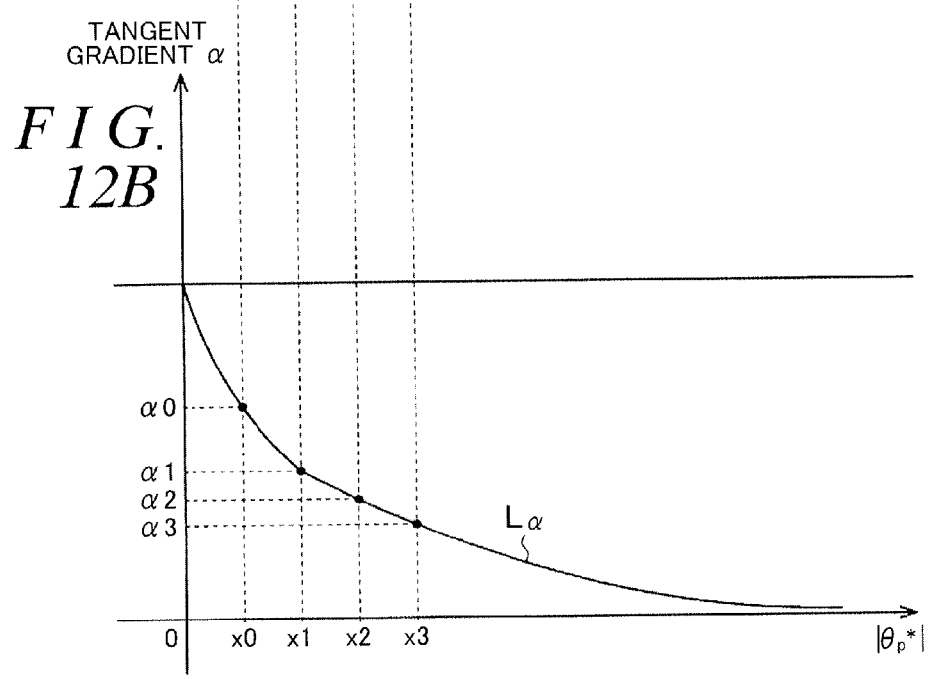
FIG. 12B is a graph showing the relationship between the target pinion angle and the characteristic gradient of the spring component.

An example of the relationship between the absolute value of the target pinion angle $\theta_p^*$ and the tangent gradient α in the characteristic line $L_{sp}$ shown in FIG. 12A will be described. As shown in FIG. 12B, in the case of plotting the absolute value of the target pinion angle $\theta_p^*$ on the abscissa axis and plotting the tangent gradient α on the ordinate axis, the tangent gradient α decreases like a curve as the absolute value of the target pinion angle $\theta_p^*$ increases from zero. The rate of change in the tangent gradient α with respect to the absolute value of the target pinion angle $\theta_p^*$ (the gradient of the tangent to the characteristic line Lα shown in FIG. 6) decreases with an increase in absolute value of the target pinion angle $\theta_p^*$. For example, when the target pinion angle $\theta_p^*$ is x0, x1, x2, and x3 (x0<x1<x2<x3), the tangent gradient α is α0, α1, α2, and α3 (α0>α1>α2>α3), respectively.

Therefore, the present embodiment can provide the following advantageous effects.

(1) A curve that more smoothly connects two points to be interpolated can be obtained by using cube interpolation. That is, a curve whose gradient changes more smoothly can be obtained. Accordingly, a more appropriate tangent gradient α and more appropriate gains $G_{vi}$, $G_{hy}$ can be calculated. A more appropriate steering feel (a feel of viscosity, a feel of friction) can thus be achieved.

The above embodiments may be modified and carried out as follows.

In the above embodiments, the steering angle $\theta_s$ is calculated based on the rotation angle $\theta_m$ of the motor 31. However, a steering sensor (rotation sensor) may be provided on the steering shaft 22, and the steering angle $\theta_s$ may be detected by the steering sensor.

In the above embodiments, the torque sensor 420 is provided on the column shaft 22a. However, the torque sensor 420 may be provided on the intermediate shaft 22b or the pinion shaft 22c. The torque sensor 420 may be provided at any position in the steering mechanism 20 as long as it can detect the steering torque $T_h$.

In the above embodiments, the pinion angle feedback control circuit 63 performs PID control of the actual pinion angle $\theta_p$. However, the pinion angle feedback control circuit 63 may perform proportional-integral (PI) control. In the above embodiments, feedback control of the pinion angle $\theta_p$ corresponding to the steered angle $\theta_{ta}$ of the steered wheels 26, 26 is performed. However, feedback control of the rotation angle of the intermediate shaft 22b may be performed. Feedback control of the rotation angle of an output shaft of the motor 31 may be performed. Since the rotation angles of the intermediate shaft 22b and the output shaft of the motor 31 are values reflecting the steered angle $\theta_{ta}$, feedback control of the steered angle $\theta_{ta}$ can be indirectly performed through the feedback control of these rotation angles. The steered angle $\theta_{ta}$ of the steered wheels 26, 26 may be detected and the detected steered angle $\theta_{ta}$ may be directly feedback controlled. In this case, the target pinion angle calculation circuit 62 functions as a target steered angle calculation circuit, and the pinion angle feedback control circuit 63 functions as a steered angle feedback control circuit.

In the above embodiments, the ideal EPS model 71 obtains the target pinion angle $\theta_p^*$ (the ideal pinion angle) based on the sum of the basic assist component $T_{a1}^*$ and the steering torque $T_h$. However, the ideal EPS model 71 may obtain the target pinion angle $\theta_p^*$ based only on the steering torque $T_h$.

In the above embodiments, the basic assist component calculation circuit 61 obtains the basic assist component $T_{a1}^*$ based on the steering torque $T_h$ and the vehicle speed V. However, the basic assist component calculation circuit 61 may obtain the basic assist component $T_{a1}^*$ based only on the steering torque $T_h$.

The electric power steering system 10 that applies a steering assist force to the column shaft 22a is embodied in the above embodiments. However, for example, an electric power steering system that applies a steering assist force to the pinion shaft 22c or the rack shaft 23 may be embodied.

What is claimed is:
1. An electric power steering system, comprising:
a motor serving as a source of a steering assist force to be applied to a steering mechanism of a vehicle; and
a control device that controls the motor according to a steering state of the vehicle; wherein
the control device includes a first calculation circuit that calculates a basic control component of the steering assist force to be applied to the steering mechanism according to at least a steering torque, a second calculation circuit that calculates, based on at least the steering torque, a target rotation angle of a rotary shaft that rotates according to a steered angle of a steered wheel, a third calculation circuit that calculates a correction control component for the basic control component through feedback control in which an actual rotation angle of the rotary shaft is caused to match the target rotation angle, a first reaction force component calculation circuit that calculates a first reaction force component in the steering assist force based on at least the target rotation angle, and a second reaction force component calculation circuit that calculates a second reaction force component in the steering assist force based on at least one of a plurality of state variables representing the steering state and the target rotation angle.

2. The electric power steering system according to claim 1, wherein the control device further includes a correction circuit that corrects the second reaction force component according to a gradient of a change in the first reaction force component with respect to the target rotation angle.

3. The electric power steering system according to claim 2, wherein the control device further includes a changing circuit that changes the first reaction force component by adding the second reaction force component to the target rotation angle that is received by the first reaction force component calculation circuit.

4. The electric power steering system according to claim 3, wherein the correction circuit includes a gradient gain calculation circuit that calculates a gain according to the gradient of the change in the first reaction force component, and a multiplier that multiplies the second reaction force component by the gain, wherein the gradient gain calculation circuit calculates the gain that has a larger value as the gradient increases.

5. The electric power steering system according to claim 2, wherein the correction circuit includes a gradient gain calculation circuit that calculates a gain according to the gradient of the change in the first reaction force component, and a multiplier that multiplies the second reaction force component by the gain, wherein the gradient gain calculation circuit calculates the gain that has a larger value as the gradient increases.

6. The electric power steering system according to claim 5, wherein the first reaction force component calculation circuit includes a spring characteristic control calculation circuit that calculates as the first reaction force component a spring component proportional to the target rotation angle, and the second reaction force component calculation circuit includes at least one of a viscosity control calculation circuit that calculates as the second reaction force component a viscosity component proportional to a steering angular velocity and a hysteresis controlled variable calculation circuit that calculates as the second reaction force component a hysteresis controlled variable that is a friction component having hysteresis characteristics with respect to a change in the steering angle.

7. The electric power steering system according to claim 2, wherein the first reaction force component calculation circuit includes a spring characteristic control calculation circuit that calculates as the first reaction force component a spring component proportional to the target rotation angle, and the second reaction force component calculation circuit includes at least one of a viscosity control calculation circuit that calculates as the second reaction force component a viscosity component proportional to a steering angular velocity and a hysteresis controlled variable calculation circuit that calculates as the second reaction force component a hysteresis controlled variable that is a friction component having hysteresis characteristics with respect to a change in the steering angle.

8. The electric power steering system according to claim 1, wherein the control device further includes a changing circuit that changes the first reaction force component by adding the second reaction force component to the target rotation angle that is received by the first reaction force component calculation circuit.

9. The electric power steering system according to claim 8, wherein the first reaction force component calculation circuit includes a spring characteristic control calculation circuit that calculates as the first reaction force component a spring component proportional to the target rotation angle, and the second reaction force component calculation circuit includes at least one of a viscosity control calculation circuit that calculates as the second reaction force component a viscosity component proportional to a steering angular velocity and a hysteresis controlled variable calculation circuit that calculates as the second reaction force component a hysteresis controlled variable that is a friction component having hysteresis characteristics with respect to a change in the steering angle.

10. The electric power steering system according to claim 1, wherein the first reaction force component calculation circuit includes a spring characteristic control calculation circuit that calculates as the first reaction force component a spring component proportional to the target rotation angle, and the second reaction force component calculation circuit includes at least one of a viscosity control calculation circuit that calculates as the second reaction force component a viscosity component proportional to a steering angular velocity and a hysteresis controlled variable calculation circuit that calculates as the second reaction force component a hysteresis controlled variable that is a friction component having hysteresis characteristics with respect to a change in the steering angle.

* * * * *